United States Patent
Marubayashi et al.

(10) Patent No.: US 10,744,905 B2
(45) Date of Patent: Aug. 18, 2020

(54) PARTITION AND VEHICLE SEAT ASSEMBLY INCLUDING THE SAME

(71) Applicants: TOYOTA BOSHOKU KABUSHIKI KAISHA, Aichi-ken (JP); HINO MOTORS, LTD., Tokyo (JP); TOYOTA JIDOSHA KABUSHIKI KAISHA, Aichi-ken (JP)

(72) Inventors: Yoshiyuki Marubayashi, Aichi-ken (JP); Naotake Hashimoto, Tokyo-to (JP); Kenji Gondo, Aichi-ken (JP)

(73) Assignees: TOYOTA BOSHOKU KABUSHIKI KAISHA, Aichi-Ken (JP); HINO MOTORS, LTD., Tokyo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 9 days.

(21) Appl. No.: 16/150,475

(22) Filed: Oct. 3, 2018

(65) Prior Publication Data

US 2019/0106017 A1    Apr. 11, 2019

(30) Foreign Application Priority Data

Oct. 6, 2017   (JP) ................. 2017-195849

(51) Int. Cl.
*B60N 2/02* (2006.01)
*B60N 2/75* (2018.01)
(Continued)

(52) U.S. Cl.
CPC .............. *B60N 2/02* (2013.01); *B60N 2/242* (2013.01); *B60N 2/305* (2013.01); *B60N 2/3047* (2013.01);
(Continued)

(58) Field of Classification Search
CPC ........ B60N 2/02; B60N 2/3047; B60N 2/305; B60N 2/753; B60N 2/242; B61D 33/00; B64D 11/0691; A47C 11/005
(Continued)

(56) References Cited

U.S. PATENT DOCUMENTS 3,762,764 A * 10/1973 McJunkin ............... B60N 2/242
297/14
4,902,069 A *  2/1990 Lehnert ............... B64D 11/0691
297/14
(Continued)

FOREIGN PATENT DOCUMENTS

DE    195 34 024    3/1997
DE    199 83 557    9/2001
JP    5685920       3/2015

OTHER PUBLICATIONS

Office Action in German patent application No. 10 2018 216684.6 dated Dec. 11, 2019, along with English language translation thereof.

*Primary Examiner* — David R Dunn
*Assistant Examiner* — Tania Abraham
(74) *Attorney, Agent, or Firm* — Greenblum & Bernstein, P.L.C.

(57) ABSTRACT

A vehicle seat assembly includes a backrest, a seat including a seat surface, and a partition. The seat is movable between a seat folded position in which the seat surface is disposed along a front surface of the backrest and a seat unfolded position in which the seat surface faces up. The partition to be disposed adjacent to a side surface of the backrest includes a fixing portion and a movable portion. The fixing portion includes a base portion that extends along the side surface and a projecting portion projecting from the base portion farther than the front surface. The movable portion is movable between a folded position adjacent to the base
(Continued)

portion and the front surface and an unfolded position away from the base portion and the front surface. The movable portion includes an armrest surface that faces up when the movable portion is in the unfolded position.

16 Claims, 8 Drawing Sheets

(51) Int. Cl.
*B60N 2/30* (2006.01)
*B60N 2/24* (2006.01)

(52) U.S. Cl.
CPC ........ *B60N 2/753* (2018.02); *B60Y 2200/143* (2013.01)

(58) Field of Classification Search
USPC .......................................................... 297/14
See application file for complete search history.

(56) References Cited

U.S. PATENT DOCUMENTS

| | | | | |
|---|---|---|---|---|
| 4,913,487 A * | 4/1990 | Breckel | ............... | B64D 11/0015 |
| | | | | 297/14 |
| 5,320,411 A * | 6/1994 | Sera | ...................... | A47C 11/005 |
| | | | | 297/331 |
| 5,829,836 A | 11/1998 | Schumacher et al. | | |
| 6,047,444 A | 4/2000 | Braun | | |
| 6,471,297 B1 * | 10/2002 | Runde | .................... | B60N 2/753 |
| | | | | 297/411.32 |
| 6,648,393 B1 * | 11/2003 | Milnar | ............... | B60N 2/01583 |
| | | | | 296/65.11 |
| 6,883,871 B2 * | 4/2005 | Nae | ........................ | B60N 2/777 |
| | | | | 297/411.32 |
| 8,186,760 B2 * | 5/2012 | Kneller | .................. | B60N 2/002 |
| | | | | 297/411.32 |
| 9,580,176 B2 * | 2/2017 | Ehlers | ..................... | B64D 11/00 |
| 9,856,024 B2 * | 1/2018 | Burd | ...................... | B64D 11/06 |
| 2002/0195868 A1 * | 12/2002 | Tsai | ....................... | B60N 2/265 |
| | | | | 297/487 |
| 2006/0255642 A1 * | 11/2006 | Epaud | .................... | B60N 2/757 |
| | | | | 297/411.38 |
| 2006/0267382 A1 * | 11/2006 | McMillen | ................ | B60N 2/20 |
| | | | | 297/115 |
| 2016/0325650 A1 * | 11/2016 | Furukawa | .............. | B60N 2/757 |
| 2016/0376007 A1 * | 12/2016 | Meindlhumer | ...... | B60N 2/3013 |
| | | | | 297/14 |

* cited by examiner

PARTITION AND VEHICLE SEAT ASSEMBLY INCLUDING THE SAME

CROSS REFERENCE TO RELATED APPLICATION

This application claims priority from Japanese Patent Application No. 2017-195849 filed on Oct. 6, 2017. The entire contents of the priority application are incorporated herein by reference.

TECHNICAL FIELD

The present disclosure relates to a partition and a vehicle seat assembly including the partition.

BACKGROUND

A vehicle seat installed in a vehicle configured to be foldable has been known. The vehicle seat can change its position between a seating position in which a passenger can be seated and a folded position in which the seat is disposed along a sidewall of the vehicle.

When the vehicle starts, stops, or turns, a force produced through change in speed is applied to a passenger in a vehicle seat. When the force is applied, an upper body of the passenger may lean forward or to the side. For passenger's safety, there is a demand for a vehicle seat to hold a passenger in a proper position in the vehicle seat.

Meanwhile, there is a strong demand for efficient use of limited space in the vehicle, that is, a space that is occupied by the vehicle seat in an unfolded position is expected to be provided as a storage space or a standing space. Namely, a seat having a function for holding a passenger in a proper position and a function for providing efficient use of the limited space in the vehicle is expected.

SUMMARY

The technology described herein was made in view of the foregoing circumstances. An object is to provide a partition and a vehicle seat assembly including the partition which provides efficient use of space in a vehicle and proper support for a passenger to hold his or her body in a proper position.

A partition configured to be disposed adjacent to a side surface of a backrest of a vehicle seat assembly installed in a vehicle includes a fixing portion and a movable portion. The fixing portion includes a base portion to extend along the side surface of the backrest and a projecting portion to project from the base portion farther from a front surface of the backrest. The movable portion is configured to be movable between a folded position adjacent to the base portion and the front surface of the backrest and an unfolded position away from the base portion and the front surface of the backrest in a direction in which the projecting portion projects from the base portion. The movable portion includes an armrest that includes an armrest surface facing up when the movable portion is in the unfolded position.

According to the partition disposed adjacent to the side surface of the backrest, when a force to move an upper body of a passenger in the vehicle seat assembly to the side is applied to the passenger, the projecting portion supports the upper body so that the passenger can hold his or her upper body in a proper position. When a force to move the upper body forward, the passenger can hold onto the armrest of the movable portion and hold his or her upper body in the proper position. Furthermore, with the movable position in the folded position, the vehicle seat assembly takes a smaller space.

A vehicle seat assembly according to the technology described herein includes a backrest, a seat including a seat surface, and the partition described above. The seat is configured to be movable between a seat folded position in which the seat surface is disposed along the front surface of the backrest and a seat unfolded position in which the seat surface faces up.

According to the vehicle seat assembly, when a force to move the upper body of the passenger in the vehicle seat assembly including the seat in the seat unfolded position to the side is applied, the projecting portion holds the upper body to hold the passenger in the proper position. When a force to move the upper body forward, the passenger can hold onto the armrest of the movable portion and hold his or her upper body in the proper position. With the seat and the movable portion in the folded positions, the vehicle seat assembly takes a smaller space.

According to the technology described herein, a partition and a vehicle seat assembly including the partition which provides efficient use of space in a vehicle and proper support for a passenger to hold his or her body in a proper position can be provided.

DETAILED DESCRIPTION

Figure 1:
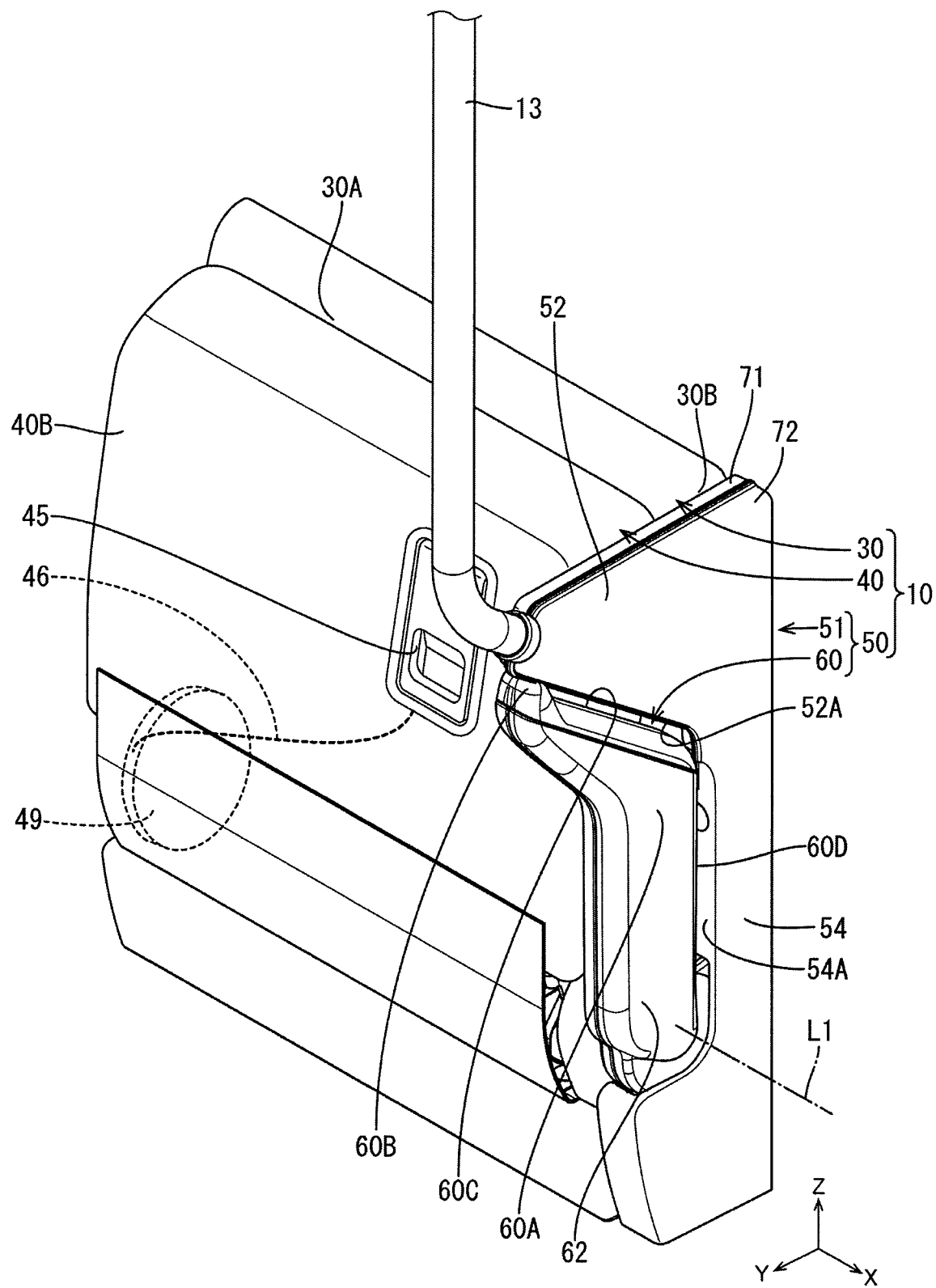
FIG. 1 is a perspective view illustrating a seat in a seat folded position according to an embodiment.

An embodiment will be described with reference to FIGS. 1 to 8. In this section, a seat assembly 10 (a vehicle seat assembly) installed in a bus that includes a standing space will be described. In the drawings, X-axes, Y-axes, and Z-axes may be present. The X-axes, the Y-axes, and the Z-axes correspond with a front-rear direction of the vehicle (a width direction of the seat assembly 10), a width direction of the vehicle (a front-rear direction of the seat assembly 10), and a vertical direction of the vehicle, respectively.

Figure 2:
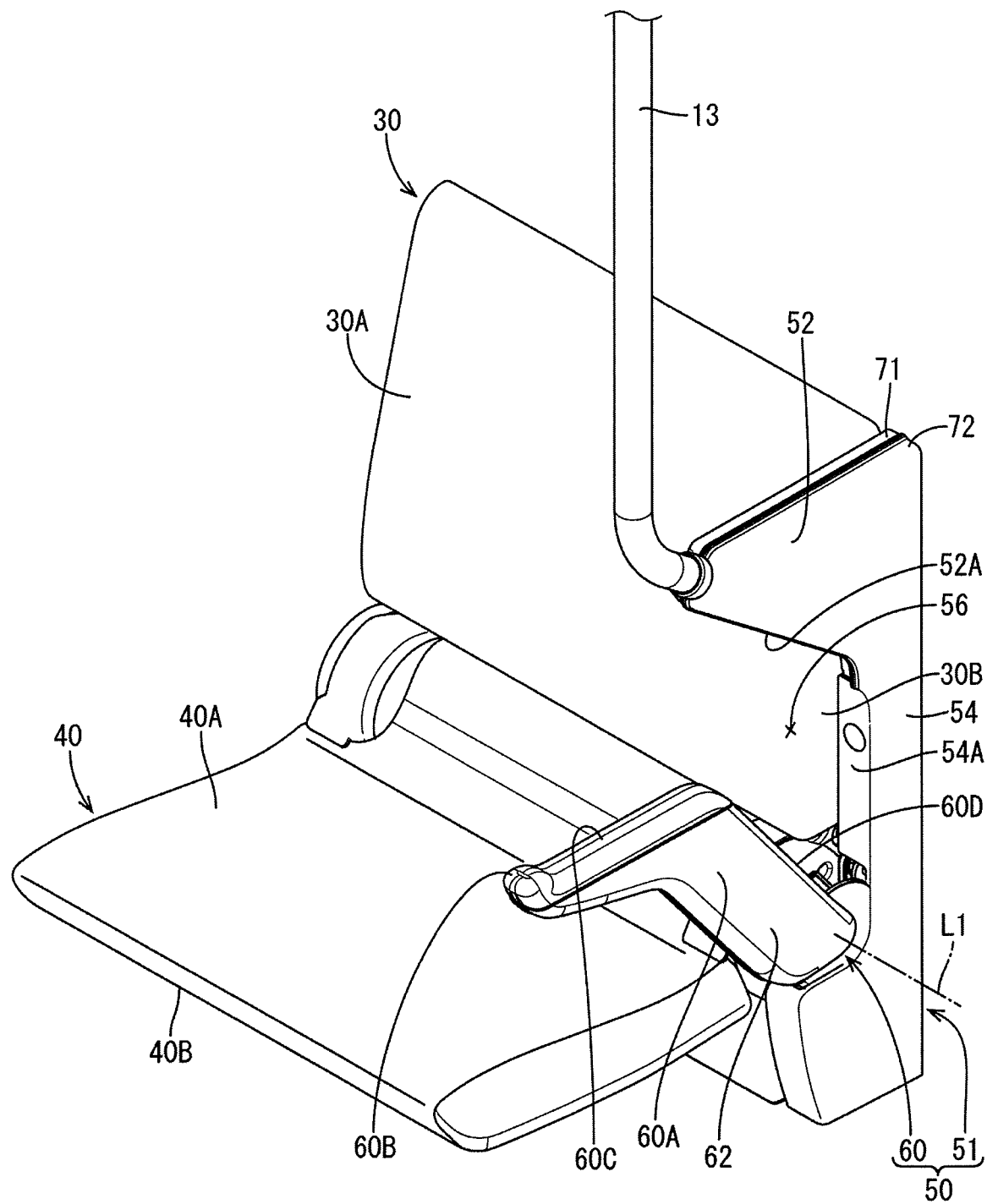
FIG. 2 is a perspective view illustrating the seat in a seat unfolded position.
Figure 5:
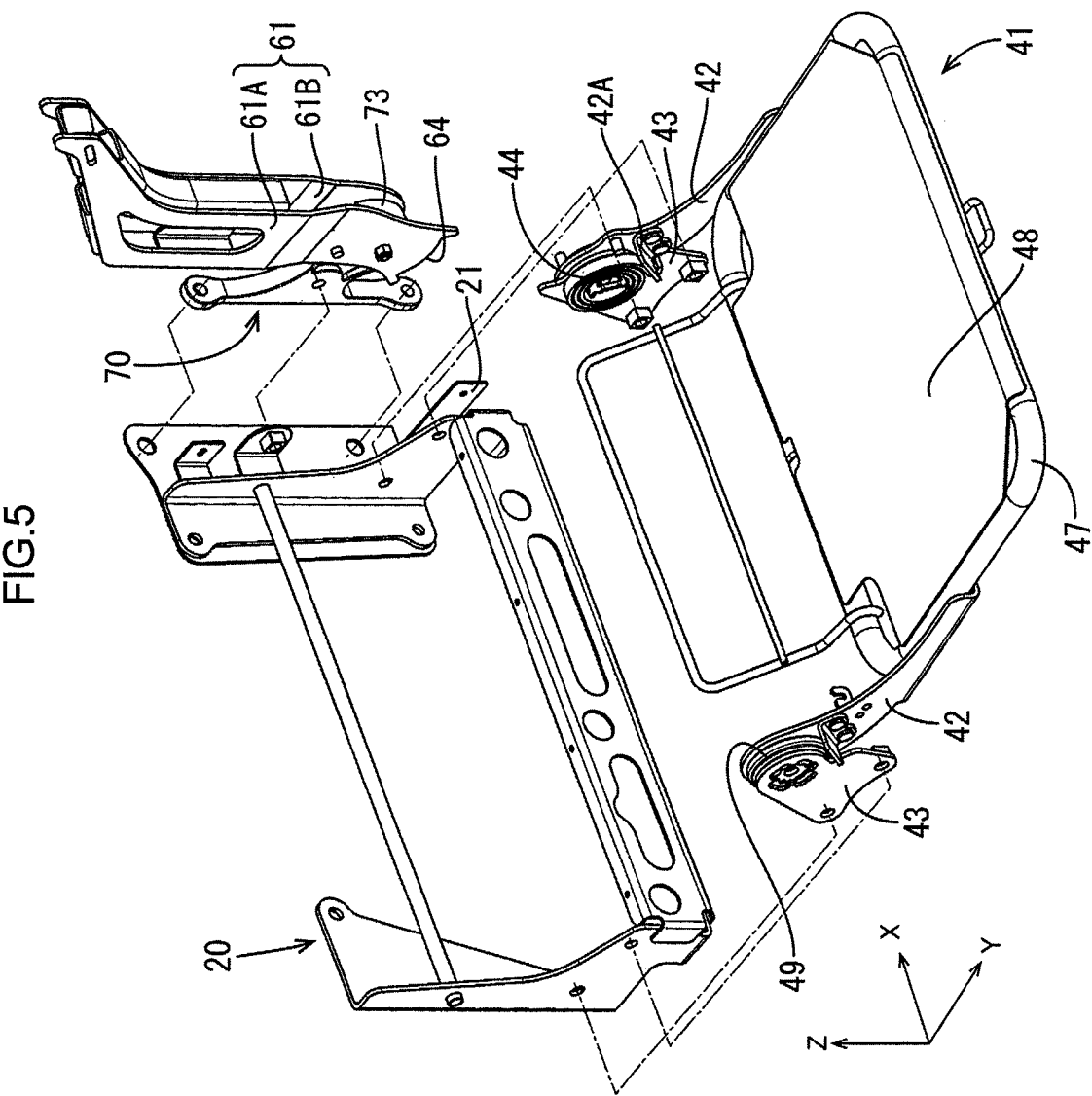
FIG. 5 is an exploded perspective view illustrating a base frame, a seat frame, and an armrest frame.
Figure 6:
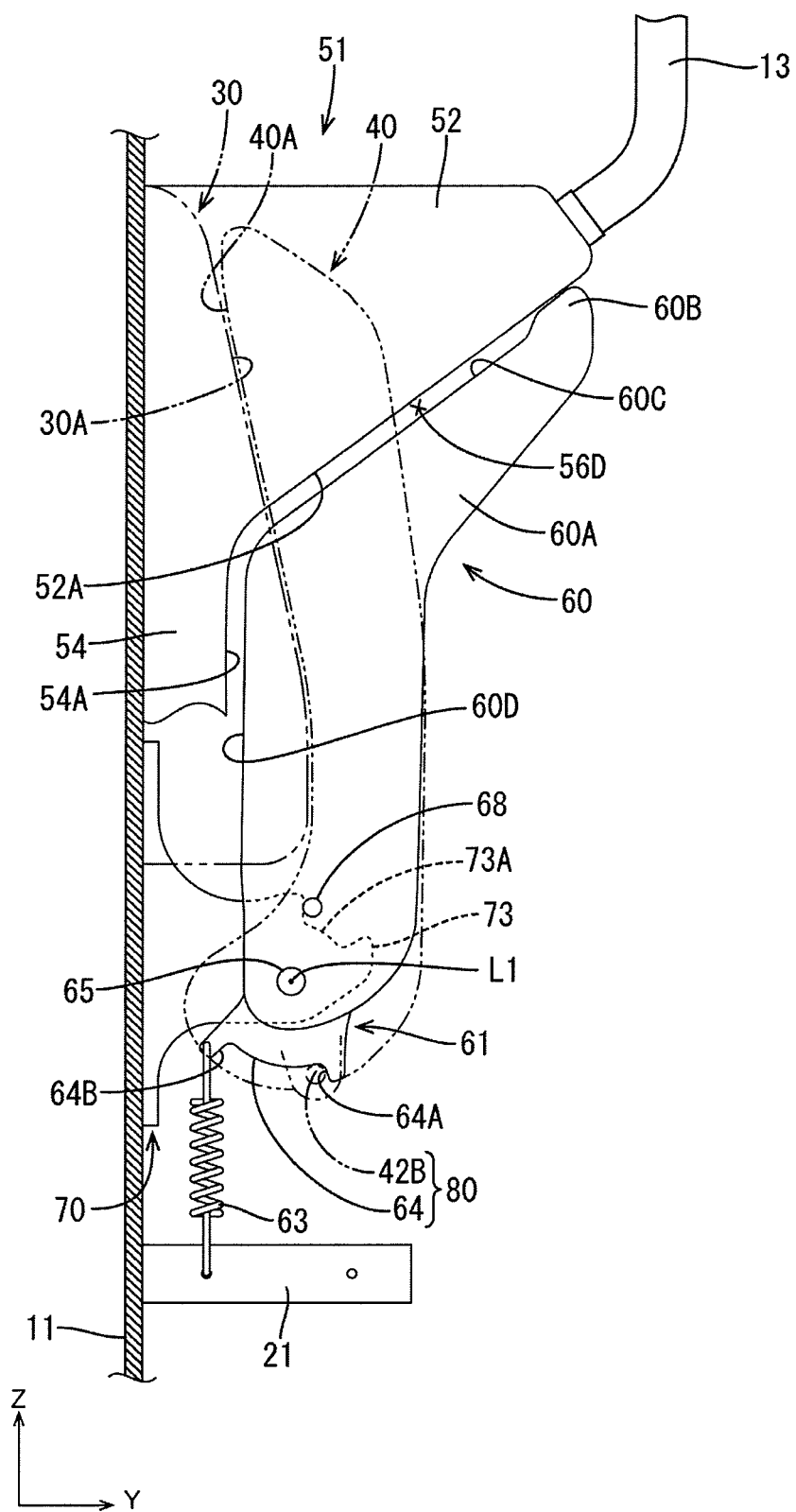
FIG. 6 is a side view illustrating the seat and a movable portion in folded positions.

As illustrated in FIGS. 1 and 2, the seat assembly 10 includes a backrest 30, a seat 40, and a partition 50. As illustrated in FIGS. 5 and 6, the seat assembly 10 further includes a base frame 20 that fixes the backrest 30 and the seat 40 to a sidewall 11 of the bus. The backrest 30 and the seat 40 are fixed to the base frame 20 and the base frame 20 is fixed to the sidewall 11 of the bus. The partition 50 is disposed adjacent to a side surface 30B of the backrest 30.

Figure 4:
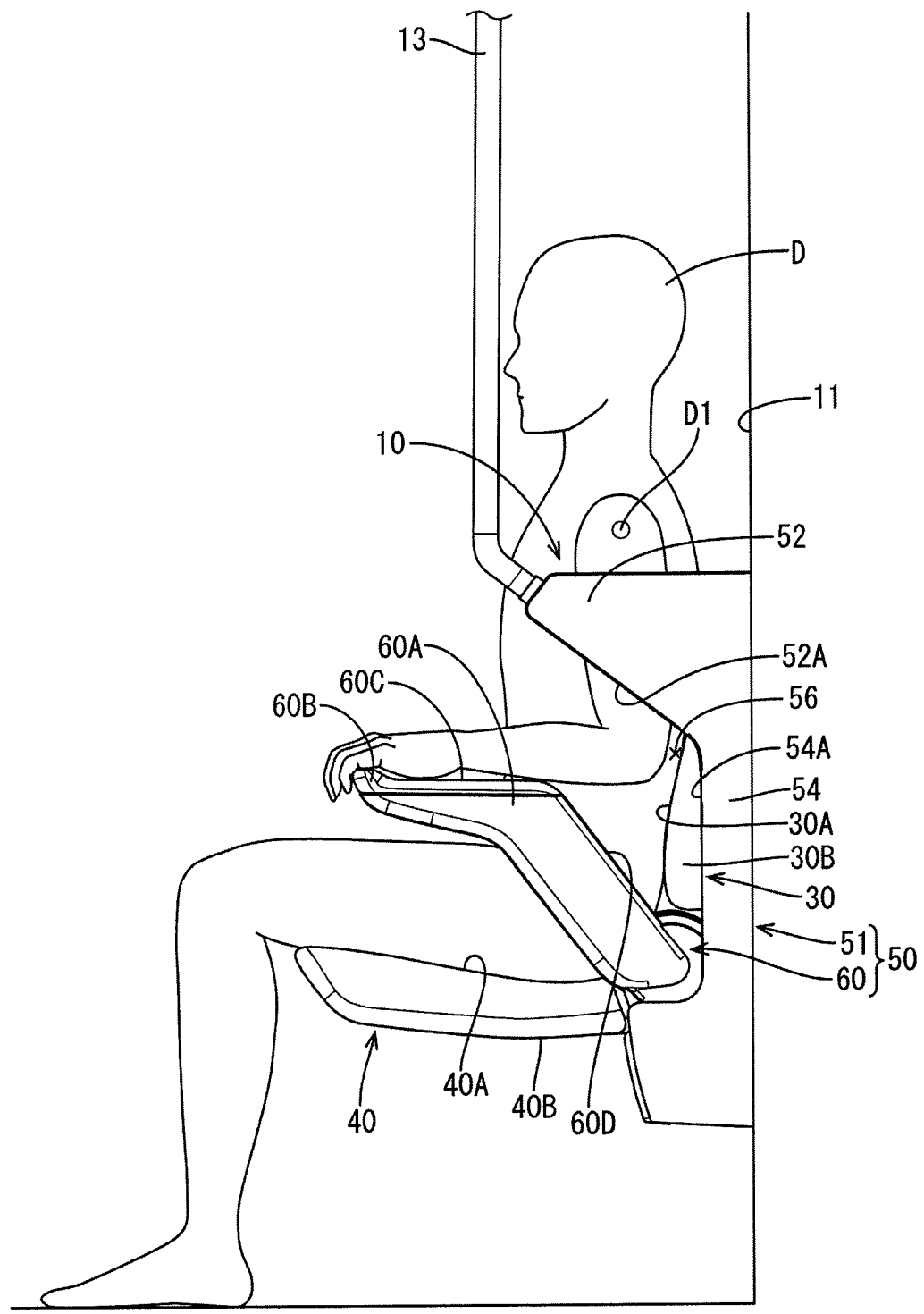
FIG. 4 is a side view illustrating the seat in the seat unfolded position.

As illustrated in FIGS. 1 and 2, the backrest 30 is fixed to the sidewall 11 not to be movable. The backrest 30 includes a cushion that covers at least the base frame 20 and a skin that covers the cushion. The backrest 30 is disposed in the vertical position. A surface of the backrest 30 on an opposite side from the base frame 20 is defined as a backrest surface 30A (a front surface). As illustrated in FIG. 4, the backrest surface 30A is positioned to face an upper back of a passenger and slightly sloped such that a lower portion of the backrest surface 30A is farther from the sidewall 11 than an upper portion of the backrest surface 30A.

As illustrated in FIGS. 1 and 2, the seat 40 is rotatable between the seat folded position and the seat unfolded position. The seat 40 includes a seat surface 40A that faces up when the seat 40 is in the seat unfolded position and faces (or is disposed along) the backrest surface 30A of the backrest 30 when the seat 40 is in the seat folded position. When the seat 40 is in the seat folded position, the seat 40 is held upright such that the seat surface 40A is opposed to the backrest surface 30A. The seat surface 40A is gently concaved to correspond to the slope of the backrest surface 30A such that the backrest 30 is fitted in the seat 40 when the seat 40 is in the seat folded position.

As illustrated in FIG. 5, the seat 40 includes a seat frame 41 that is made of metal. The seat frame 41 includes a pipe frame 47, a pair of side plates 43 (a first side plate and a second side plate), a pair of side arms 42 (a first side arm and a second side arm), and a panel 48 that is fixed to the pipe frame. The panel includes a surface disposed along the seat surface 40A. The pipe frame 47 is a framework of the seat 40. The pipe frame 47 has a rectangular frame shape. The pipe frame 47 is fixed to the side arms 42. The seat 40 further includes the cushion that covers the seat frame 41 and the skin to cover the cushion. One of the side plates 43 (a first side plate) is disposed outer than a first sidewall of the base frame 20 (a second portion of the base frame) in the width direction of the seat 40 and fixed to the sidewall of the base frame 20. The other one of the side plates 43 (a second side plate) is disposed outer than a second sidewall of the base frame 20 (a third portion of the base frame opposite from the second portion of the base frame). The side arms 42 are attached to the side plates 43 to be rotatable with respect to the side plates 43.

As illustrated in FIG. 5, the seat 40 further includes a wound spring 44 (a seat holding member) are attached to one of the side plates 43. The side arms 42 include brackets 42A. One of ends of the wound spring 44 is fixed to the corresponding bracket 42A. With the wound spring 44, the seat 40 rotated to the seat folded position is held in the seat folded position. The seat 40 further includes a locking mechanism 49 each located between the side arms 42 and the side plates 43. The locking mechanism 49 is provided for holding the seat 40 in the seat folded position. The locking mechanism 49 may be but not limited to a round recliner. Specifically, the side plate 43 is fixed to an outer surface of the round recliner with respect to the width direction of the seat 40 and the side arm 42 is fixed to an inner surface of the round recliner with respect to the width direction of the seat 40. With the round recliners, the side arms 42 are rotatable relative to the respective side plates 43. As illustrated in FIG. 1, the seat 40 further includes a lever 45. The lever 45 is disposed in a back surface 40B of the seat 40 opposite from the seat surface 40A. When the seat 40 is in the seat folded position, the lever 45 is visible. The lever 45 is connected to the locking mechanism 49 via a wire 46 disposed inside the seat 40. By pulling the lever 45, the locking mechanism 49 is activated via the wire 46 and the seat 40 is released from the locking mechanism 49.

As illustrated in FIGS. 1 and 2, the partition 50 includes a fixing portion 51 that is fixed to the sidewall 11 with a fixing member not to be movable relative to the backrest 30 and a movable portion 60 that is fixed to the sidewall 11 with a fixing member 70 to be movable relative to the backrest 30. The fixing portion 51 includes a base portion 54 that has an L-shape and extends along the side surface 30B of the backrest 30 and a projecting portion 52 that projects from an upper portion of the base portion 54 farther than the backrest surface 30A of the backrest 30. The movable portion 60 is rotatable between the folded position and the unfolded position. When the movable portion 60 is in the folded position, the movable portion 60 is located adjacent to the projecting portion 52. The movable portion 60 is rotatable from the folded position to the unfolded position in which the seat surface 40A is farther from the backrest surface 30A in comparison to the folded position.

With the movable portion 60 in the folded position, the partition 50 functions as a projecting wall that projects from the sidewall 11. The partition 50 is positioned relative to the backrest 30 to extend between the top edge of the backrest 30 to the bottom edge of the seat 40 to cover the side surface 30B of the backrest 30 and a side surface of the seat 40. An upper portion of the partition 50 (including the projecting portion 52 of the fixing portion 51 and an armrest surface 60C of the movable portion 60) projects from the sidewall 11 farther than the back surface 40B of the seat 40 in the seat folded position. A lower portion of the partition (including an extending surface 60D of the movable portion 60) project from the sidewall 1 to a position at which the back surface 40B of the seat 40 in the seat folded position is located. The partition 50 with the movable portion in the unfolded position separates a seating space provided by the seat assembly 10 from a space lateral to the seating space. When another seat assembly is installed adjacent to the seat assembly 10, the partition 50 separates the seating space from a seating space provided by the other seat assembly.

Figure 3:
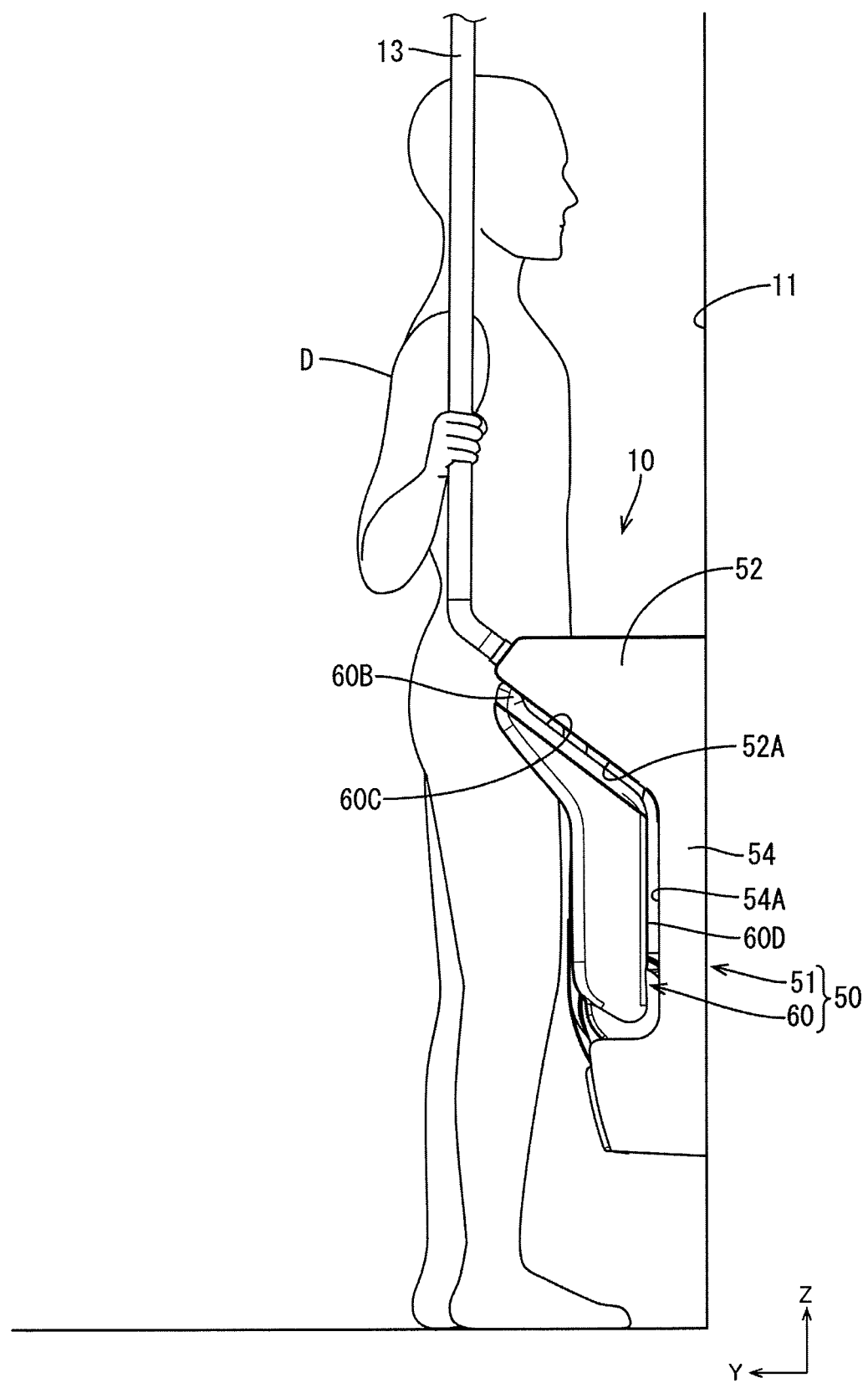
FIG. 3 is a side view illustrating the seat in the seat folded position.

As illustrated in FIGS. 3 and 4, the projecting portion 52 projects farther than not only the backrest 30 but also the seat 40 in the seat folded position (see FIG. 6). The projecting portion 52 has a right triangular shape in the side view. The projecting portion 52 has a top surface that extends in the front-rear direction and a lower surface 52A that is a sloped surface declining toward an upper edge of an inner surface 54A of the base portion 54. A stanchion pole 13 is connected to a front end of the projecting portion 52. The partition 50 includes a holding space 56 in which the movable portion 60 in the folded position is placed. The holding space 56 is defined by the inner surface 54A of the base portion 54 and the lower surface of the projecting portion 52. The movable portion 60 in the folded position is held in the holding space 56 in front of the fixing portion 51. The lower surface 52A of the projecting portion 52 is sloped with an obtuse angle relative to the inner surface 54A.

As illustrated in FIG. 4, the projecting portion 52 is disposed at a position to be opposed to an upper arm of a passenger in the seat 40. When an upper body of the passenger leans to the side, the upper arm of the passenger is held against the projecting portion 52 so that the upper body of the passenger remains in the seating space. A dummy D (a JM50-type dummy) seated in the seat 40 is illustrated in FIG. 4. The dummy D is in a standard body size of Japanese adult male covering about 50% of Japanese adult male. A shoulder joint position D1 of the dummy D is indicated by D1. The projecting portion 52 is disposed such that the upper edge of the projecting portion 52 is located lateral to the upper portion of the upper arm and the lower edge of the projecting portion 52 is located between an elbow of the dummy D and the upper portion of the upper arm. The front edge of the projecting portion 52 is located farther from the sidewall 11 than the upper arm. If a passenger having a body size smaller than the dummy D is seated in the seat 40, a position of a shoulder of the passenger is closer to the sidewall 11 and lower in comparison to the dummy D. With the projecting portion 52 having a vertical dimension that increases toward the sidewall 11, the upper arm of the passenger having the body size smaller than the dummy D can be held against the projecting portion 52. If a passenger having a body size larger than the dummy D is seated in the seat 40, a position of a shoulder of the passenger is farther from the sidewall 11 and upper in comparison to the dummy D. With the projecting portion 52 having a horizontal dimension increases toward the top surface of the projecting portion 52, the upper arm of the passenger having the body size larger than the dummy D can be held against the projecting portion 52.

Figure 8:
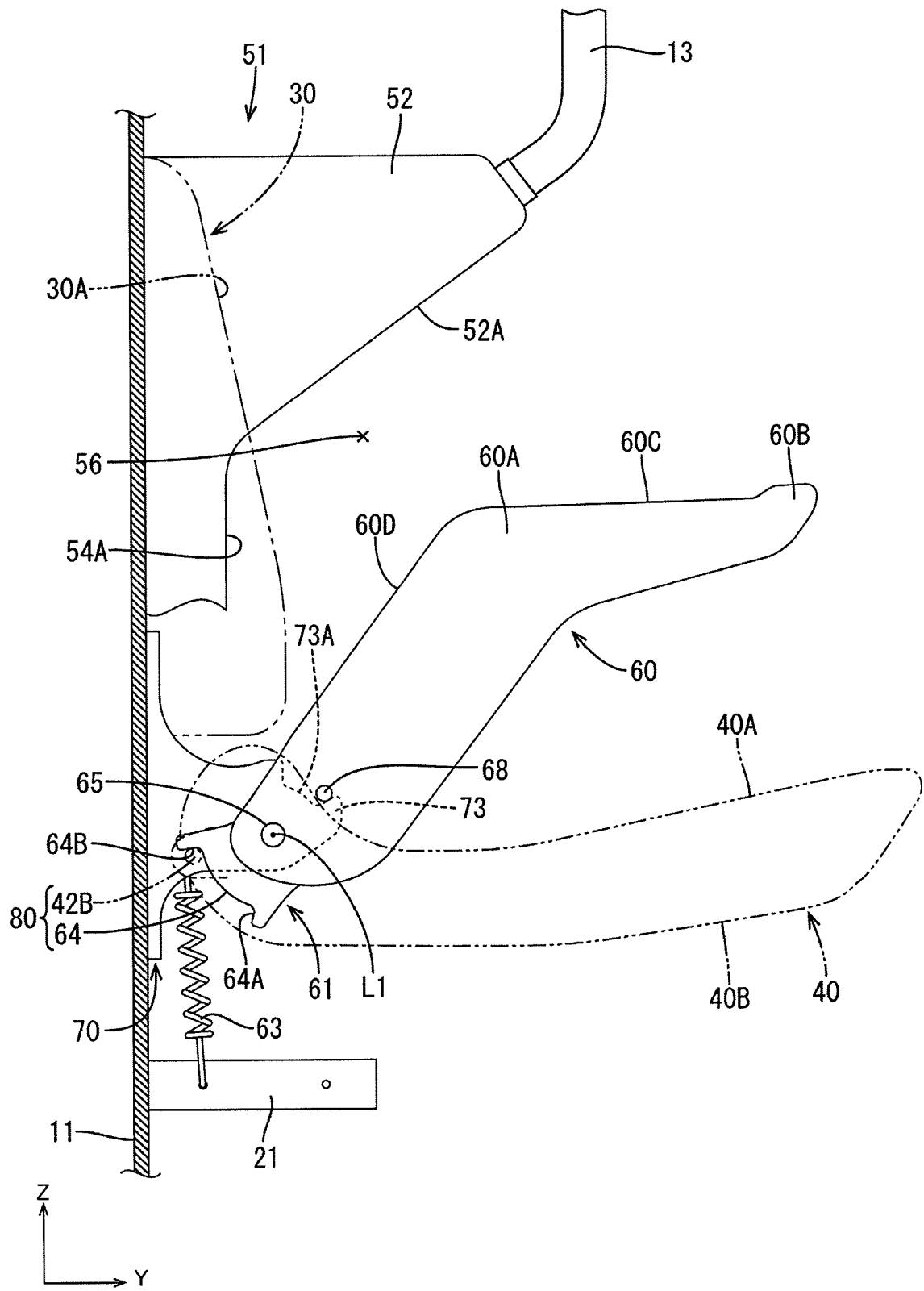
FIG. 8 is a side view illustrating the seat and the armrest in the unfolded positions.

As illustrated in FIG. 1, the movable portion 60 includes a base 60A, a protrusion 60B, the armrest surface 60C, and the extending surface 60D. The base 60A has an L-shape with an obtuse angle corner. The base 60A includes an upper section that includes the armrest surface 60C and a lower section that includes the extending surface 60D. The upper section including the armrest surface 60 functions as an armrest when the movable portion is in the unfolded position as illustrated in FIGS. 2 and 8. As illustrated in FIG. 4, the armrest surface 60C of the movable portion 60 faces up when the movable portion 60 is in the unfolded position and thus the passenger can place his or her arm on the armrest surface 60C. The extending surface 60D of the movable portion 60 extends from a first end of the armrest surface 60C closer to the base portion 54. The extending surface 60D is sloped downward toward the base portion 54 when the movable portion 60 is in the unfolded position. The protrusion 60B protrudes upward from a second end of the armrest surface 60C away from the base portion 54.

The movable portion 60 rotates about a rotation axis L1 closer to a distal end of the extending surface 60D away from the first end of the armrest surface 60C, that is, a lower edge of the extending surface 60D. When the movable portion 60 is in the folded position, the movable portion 60 is disposed in the holding space 56 with the extending surface 60D in the vertical direction. The movable portion 60 has an elongated L shape with an obtuse angled corner. The movable portion 60 extends along the lower surface 52A and the inner surface. The movable portion 60 is configured to rotate about the rotation axis L1 at the lower end of the movable portion 60. The movable portion 60 has a dimension in a width direction of the seat assembly 10 (the X-axis direction) about equal to that of the fixing portion 51. According to the configuration, when the movable portion 60 is in the folded position, the movable portion 60 is less likely to project from the projecting portion 52 toward the front or the side. The movable portion 60 in the folded position properly remains in the holding space 56. When the movable portion 60 is in the unfolded position, a distance from the fixing portion 51 is larger as a distance from the rotation axis L1 in the vertical direction increases.

When the movable portion 60 is in the folded position, the protrusion 60B contacts the lower surface 52A of the projecting portion 52. The movable portion 60 is disposed in the holding space 56 with a gap 56D between the armrest surface 60C and the lower surface 52A of the projecting portion 52 and between the extending surface 60D and the inner surface 54A of the fixing portion 51. The protrusion 60B is a grip tow which a passenger in the seat 40 can hold. The protrusion 60B includes a distal end surface that is a flat surface extending parallel to the armrest surface 60C. The distal end surface of the protrusion 60B of the movable portion 60 in the folded position contacts the lower surface 52A of the projecting portion 52. The movable portion 60 is held in the folded position with a spring 63. The movable portion 60 in the folded position remains contacting with the lower surface 52A with an elastic force of the spring 63. When the protrusion 60B is in contact with the lower surface 52A, the armrest surface 60C is opposed to a section of the lower surface 52A closer to the fixing portion 51 than the section of the lower surface 52A in contact with the protrusion 60B and the extending surface 60D is opposed to the inner surface 54A. The height of the protrusion 60B is slightly larger than a thickness of a finger so that a passenger can grip the protrusion 60B and the finger is less likely to be stuck in the gap 56D between the armrest surface 60C and the lower surface 52A or between the extending surface 60D and the inner surface 54A.

As illustrated in FIGS. 1 and 5, the movable portion 60 includes an armrest frame 61 and an armrest cover 62. The armrest frame 61 includes a first plate 61A and a second plate 61B having shapes corresponding to the outline of the movable portion 60. The movable portion 60 is fixed to the fixing member 70 that is fixed to one of sides of the base frame 20 (a first portion of the base frame). The backrest 30 is fixed to the base frame 20 with the side surface of the backrest 30 disposed adjacent to the one of sides of the base frame 20. Namely, the movable portion 60 is fixed to the base frame 20 via the fixing member 70. The fixing member 70 includes a projection 73 in the middle of the vertical dimension of the fixing member 70. The projection 73 projects toward the inner side of the interior of the bus. The first plate 61A and the second plate 61B are disposed to sandwich the projection 73 and attached to the projection 73 with a hinge pin 65 (see FIG. 6) to be rotatable relative to the projection 73. The movable portion 60 is rotatable between the folded position illustrated in FIGS. 6 and 7 and the unfolded position illustrated in FIG. 8. As illustrated in FIG. 1, a large portion of the fixing member 70 (not covered with the armrest cover 62) are sandwiched and covered with resin covers 71 and 72 that define sections of an exterior of the fixing portion 51.

Figure 7:
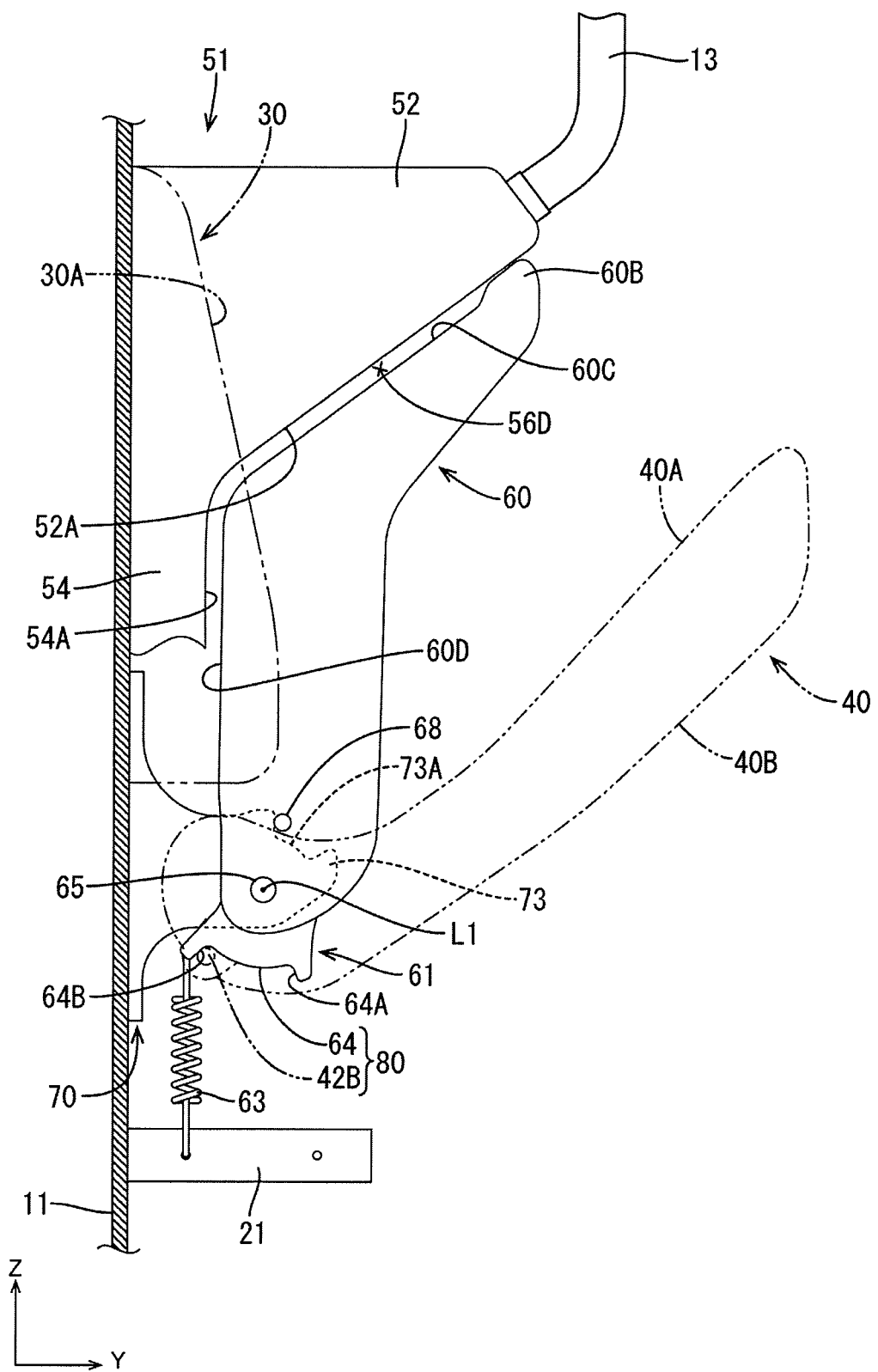
FIG. 7 is a side view illustrating the seat in a position between the seat folded position and the seat unfolded position and the movable portion in the folded position.

The rotation of the movable portion 60 and positional relationships among the components of the seat assembly 10 will be described with reference to FIGS. 6 to 8. When the movable portion 60 is in the unfolded position, the armrest surface 60C faces up, that is, the armrest surface 60C is about horizontal so that a passenger can place his or her lower arm on the armrest surface 60C. When the movable portion 60 is rotated about the rotation axis L1 and set in the folded position, the armrest surface 60C is disposed upper and closer to the backrest 30 than the armrest surface 60C in the unformed position. The rotation axis L1 of the movable portion 60 and a rotation axis of the seat 40 are parallel to each other and in the horizontal direction. More specifically, the rotation axis L1 of the movable portion 60 and the rotation axis of the seat 40 are coaxially disposed. In the drawings, the rotation axis of the seat 40 is also indicated by L1.

The movable portion 60 includes the lower section that includes the extending surface 60D and extends from the upper section that includes the armrest surface 60C toward the rotation axis L1 of the seat 40. The rotation axis L1 of the movable portion 60 is located at an end of the lower section of the movable portion 60 farther from the upper section. A rotation angle of the movable portion 60 between the folded position and the unfolded position is about 35 degrees. A rotation angle of the seat 40 between the seat folded position and the seat unfolded position is about 90 degrees. The rotation angle of the movable portion 60 is smaller than the rotation angle of the seat 40. The rotation angle of the seat 40 and the rotation angle of the movable portion 60 can be altered where appropriate as long as the rotation angle of the movable portion 60 is smaller than the rotation angle of the seat 40. As illustrated in FIG. 8, the armrest surface 60C of the movable portion 60 in the unfolded position is located above the seat surface 40A of the seat 40 in the seat unfolded position.

A first end of the spring 63 is fixed to the lower portion of the armrest frame 61. A second end of the spring 63 is fixed to the bracket 21 of the base frame 20. The movable portion 60 is held in the folded position. The projection 73 includes a slit 73A in the upper surface. A positioning pin 68 included in the movable portion 60 is fitted in the slit 73A.

The slit 73A extends along a circle centered at a point on the rotation axis L1 of the movable portion 60. When the movable portion 60 is in the folded position, the positioning pin 68 contacts an inner edge of the slit 73A on the exterior side to restrict the movable portion 60 from rotating toward the backrest 30. When the movable portion 60 is in the unfolded position, the positioning pin 68 contacts an inner edge of the slit 73A on the interior side to restrict the movable portion 60 toward the seat 40.

The seat assembly 10 further includes an interlocking mechanism 80 to rotate the movable portion 60 in conjunction with the rotation of the seat 40 between the seat folded position and the seat unfolded position. The interlocking mechanism 80 includes a pin 42B projecting from a surface of the side arm 42 and a cutout 64 formed in a lower portion of the armrest frame 61, more specifically, in the first plate 61A. As illustrated in FIG. 6, the cutout 64 is formed in an arc shape along a locus of the pin 42B that circles around the rotation axis L1. The pin 42B projects from the side arm 42 toward the movable portion 60. The pin 42B is fitted in the cutout 64. The pin 42B is located below the rotation axis L1.

Operation of the interlocking mechanism 80 will be described with reference to FIGS. 4 to 6. As illustrated in FIG. 6, when the seat 40 and the movable portion 60 are in the folded positions, the pin 42B is at a first elevational edge 64A of the cutout 64 with respect to a direction in which the cutout 64 extends. When the seat 40 is rotated to the seat unfolded position (clockwise in FIG. 6), the pin 42B rotates clockwise in the cutout 64. As illustrated in FIG. 7, the seat 40 is rotated to a midpoint between the seat folded position and the seat unfolded position, the pin 42B contacts a second elevational edge 64B of the cutout 64 on the exterior side (a holding edge, an edge of the cutout 64 of the armrest frame 61). A rotation angle of the seat 40 between the seat folded position and the midpoint is equal to a difference between the rotation angle of the seat 40 between the seat folded position and the seat unfolded position and the rotation angle of the movable portion 60 between the folded portion and the unfolded portion.

The cutout 64 extends along a locus of the pin 42B that circles when the seat 40 rotates from the seat folded position to the midpoint. During the rotation of the seat 40 from the seat folded position to the midpoint, the pin 42B does not contact the second elevational edge 64B and thus the pin 42B does not cause the rotation of the movable portion 60. During the rotation of the seat 40 from the midpoint to the seat unfolded position, the pin 42B contacts the second elevational edge 64B and pushes the movable portion 60 as the pin 42B circles. The movable portion 60 pushed by the pin 42B rotates clockwise from the folded position to the unfolded position. The seat 40 and the movable portion 60 are set in the unfolded positions as illustrated in FIG. 8.

Conditions of the seat assembly 10 when the seat 40 is in the seat folded position and when the seat 40 is in the seat unfolded position will be described with reference to FIGS. 3 and 4. When the seat 40 is locked in the seat folded position, the movable portion 60 is locked in the folded position through the interlocking mechanism 80. In a lower portion of the seat assembly 10 in this condition, a space corresponding to thicknesses of the backrest 30 and the seat 40 is provided. A passenger in front of the seat assembly 10 can stand facing the sidewall 11 of the bus with his or her toe inserted in the space. A passenger in front or the seat assembly 10 and facing away from the sidewall 11 may lean his or her leg against the back surface 40B of the seat 40. Namely, when the seat 40 in the seat folded position, the bus can hold a larger number of passengers and provide more comfortable standing space or baggage storage space. When the movable portion 60 is in the folded position, a passenger is supported by the projecting portion 52 and the armrest that includes the armrest surface 60C in the partition 50 when a force is applied to the passenger to move the upper body in the front-rear direction of the bus. Therefore, the passenger can remain in a proper position.

To set the seat 40 in the seat unfolded position, a passenger pulls the lever 45 to release the seat 40 from the locking mechanism 49 and rotates the seat 40 to the seat unfolded position. Through the interlocking mechanism 80, the movable portion 60 rotates to the unfolded position in conjunction with the seat 40. When the seat 40 and the movable portion 60 are in the unfolded position, the passenger can sit in the seat 40 such that his or her bottom is held by the gently curved portion of the seat surface 40A as illustrated with the dummy D in FIG. 4. The passenger may lower his or her body using the top of the fixing portion 51 or the armrest surface 60C of the movable portion 60 as a support to sit in the seat 40. The passenger may lean on the backrest surface 30A of the backrest 30 to sit in the seat 40 in a stable position with his or her upper body slightly leaning backward. The upper arm of the passenger sitting of the seat 40 may be opposed to the projecting portion 52 of the fixing portion 51. The passenger can insert his or her lower arm between the movable portion 60 in the unfolded position and the fixing portion 51 and comfortably place his or her lower arm on the armrest surface 60C. Furthermore, the passenger can place his or her hand on the protrusion 60B while his or her lower arm is placed on the armrest surface 60C. when the force is applied to the upper body of the passenger, the passenger can hold the protrusion 60B to hold himself or herself in the seating space.

Next, effects of this embodiment will be described. According to this embodiment, when the seat 40 and the movable portion 60 are in the folded positions, the components of the seat assembly 10 are disposed in a smaller space. When the seat 40 is in the seat unfolded position, the upper body of the passenger can be supported by the projecting portion 52 to hold the upper body when a force to move the upper body in the lateral direction is applied to the passenger. Namely, when a force to move the upper body in the lateral direction is applied to the passenger during sudden start or stop, the projecting portion 52 restricts the upper body from moving in the lateral direction (toward the front or the rear of the bus). When the seat assembly 10 is disposed adjacent to another seat assembly having the same configuration as the seat assembly 10, the projecting portion 52 restricts passengers in the seat assembly 10 and the other seat assembly from bumping into each other. When a force to move the upper body forward, the passenger can hold onto the movable portion 60 that is in the unfolded position so that the upper body does not move forward, that is, the passenger can hold his or her upper body in a proper position. When the bus turns, the upper body is less likely to lean forward in the seat assembly 10. Namely, passenger's safety during the sudden start or stop and the turning of the bus improves. The seat assembly 10 including the partition 50 provides efficient use of space in the bus with the seat 40 set in the seat folded position and support for the passenger to hold his or her position.

When the movable portion 60 in the folded position, the movable portion 60 is in the vertical position and disposed in the holding space 56 under the projecting portion 52. Namely, the movable portion 60 and the fixing portion 51 are disposed in a small space. Furthermore, the projecting portion 52 is located above the holding space 56. The projecting portion 52 supports the upper arm of the passenger, that is, the projecting portion 52 properly holds the upper body of the passenger. The rotation axis L1 of the movable portion 60 is at the end of the extending surface 60D. In comparison to a configuration in which the rotation axis L1 is at a rear end of the armrest surface 60C that is in the unfolded position, the armrest surface 60C is rotatable farther forward with a smaller angle. The movable portion 60 that is in the folded position takes a smaller space but the movable portion 60 that is in the unfolded position provides proper support for the passenger.

When the seat 40 is in the seat unfolded position, the passenger in the seat 40 can hold onto the protrusion 60B to hold his or her upper body in the proper position. When the movable portion 60 is in the folded position, the protrusion 60B contacts the lower surface 52A of the projecting portion 52. The armrest surface 60C and the extending surface 60D are disposed with the gap 56D between the armrest surface 60C and the inner surface 54A. Therefore, clothes are less likely to be caught between the movable portion 60 and the fixed portion 51.

The seat assembly 10 includes the spring 63 that applies a force to the movable portion 60 to hold the movable portion 60 in the folded position. With the force of the spring 63, the movable portion 60 is less likely to freely move and the movable portion 60 stably moves.

This embodiment includes the interlocking mechanism 80. In comparison to a configuration in which the movable portion 60 is configured to rotate separately from the seat 40, this embodiment is more convenient because the movable portion 60 is rotatable in conjunction with the seat 40. When the seat 40 is locked in the seat folded position, the movable portion 60 does not rotate to the unfolded position. Therefore, the movable portion 60 is less likely to rotate to the unfolded position when the support by the movable portion 60 is not needed.

When the seat 40 is in the seat folded position, the projecting portion 52 projects farther than the seat 40. When the seat 40 is in the seat unfolded position, the passenger is properly supported by the projecting portion 52 from the side. When the seat 40 is in the seat folded position, the projecting portion 52 can be a support for a passenger standing in front of the seat 40.

Other Embodiments

The technology described herein is not limited to the embodiment described in the above description and the drawings. The technology described herein may include the following embodiments.

(1) The seat assembly 10 may be installed in a vehicle other than the bus, for example, a train, an amusement vehicle, an airplane, a helicopter, a boat, a ship, and an underwater vehicle.

(2) An interlocking mechanism including gears or links may be used to rotate the movable portion 60 in conjunction with the seat 40.

(3) The rotation axis of the seat 40 and the rotation axis of the movable portion 60 may be coaxially arranged. The rotation axis of the seat 40 may be slightly off the rotation axis of the movable portion 60 in the vertical direction.

(4) The fixing member 70 and the movable portion 60 may be fixed to either side of the base frame 20.

(5) The shapes of the partition 50, the fixing portion 51, and the movable portion 60 can be altered where appropriate. The fixing portion 51 may define a holding space in front of or the side of the projecting portion 52. The configuration of the projecting portion 52 can be altered where appropriate. The movable portion 60 may not include the protrusion 60B.

(6) The way of rotation of the movable portion 60 and the seat 40 can be altered where appropriate. The movable portion 60 may not rotate in conjunction with the seat 40. The technology described herein may be applied to a vehicle seat assembly including a seat that can be set in a seat unfolded position with a seat surface facing up and in a seat folded position by lifting a rear end of the seat surface.

The invention claimed is:

1. A partition configured to be disposed adjacent to a backrest and a seat movable between a seat folded position and a seat unfolded position installed in a vehicle, the partition comprising:
 a fixing portion comprising:
  a base portion to extend along the side surface of the backrest; and
  a projecting portion configured to project from the base portion in a front-rear direction of the backrest such that the projecting portion projects farther from a front surface of the backrest and a back surface of the seat when the seat is in the seat folded position; and
 a movable portion configured to be movable between a folded position adjacent to the projecting portion and the base portion and an unfolded position away from the projecting portion and the base portion in the front-rear direction of the backrest, wherein the movable portion includes an armrest including an armrest surface facing up when the movable portion is in the unfolded position.

2. The partition according to claim 1, wherein the projecting portion is configured to project in the front-rear direction of the backrest from an upper portion of the base portion so as to project beyond the movable portion when the movable portion is in the folded position.

3. The partition according to claim 1, wherein the movable portion includes an extending surface that extends from a first end of the armrest surface such that when the movable portion is in the unfolded position the extending surface is inclined downward and rearwardly toward the base portion in the front-rear direction of the backrest and when the movable portion is in the folded position the extending surface is in a vertical position and the armrest surface is inclined upward and forwardly in the front-rear direction of the backrest along a lower side of the projecting portion.

4. The partition according to claim 1, wherein
when the movable portion is in the folded position and the seat is in the seat folded position the armrest projects forwardly of the seat in the front-rear direction of the backrest.

5. A vehicle seat assembly comprising:
a backrest;
a seat including a seat surface and being configured to be movable between a seat folded position in which the seat surface is disposed along the front surface of the backrest and a seat unfolded position in which the seat surface faces up; and
a partition comprising:
a fixing portion comprising:
a base portion to extend along a side surface of the backrest; and
a projecting portion configured to project from the base portion in a front-rear direction of the backrest such that the projecting portion projects farther from a front surface of the backrest and a back surface of the seat when the seat is in the seat folded position; and
a movable portion configured to be movable between a folded position adjacent to the projecting portion and the base portion and an unfolded position away from the projecting portion and the base portion in the front-rear direction of the backrest, wherein the movable portion includes an armrest including an armrest surface facing up when the movable portion is in the unfolded position.

6. The vehicle seat assembly according to claim 5, wherein
the fixing portion includes a holding space for holding the movable portion in the folded position,
the holding space is located under the projecting portion,
the movable portion includes an extending surface that extends from an end of the armrest surface closer to the base portion,
the extending surface of the movable portion in the unfolded position slopes toward the base portion,
the movable portion is configured to be rotatable about a rotation axis at an end of the extending surface away from the end of the armrest surface, and
when the movable portion is in the folded position, the movable portion is disposed in the holding space such that the extending surface of the movable portion is in a vertical position.

7. The vehicle seat assembly according to claim 6, wherein
the movable portion includes a protrusion that protrudes from an end of the armrest surface away from the base portion,
when the movable portion is in the folded position, the protrusion of the movable portion contacts the projecting portion, and
when the movable portion is in the folded position and disposed in the holding space, a first gap is defined between the armrest surface of the movable portion and a lower surface of the projecting portion, and a second gap is defined between the extending surface of the movable portion and an inner surface of the base portion.

8. The vehicle seat assembly according to claim 5, further comprising a holding member configured to apply a force to the movable portion to hold the movable portion in the folded position.

9. The vehicle seat assembly according to claim 8, wherein the backrest and the seat are configured to be fixed to a sidewall of the vehicle.

10. The vehicle seat assembly according to claim 9, further comprising:
a base frame to be fixed to the sidewall of the vehicle to fix the backrest and the seat to the sidewall of the vehicle; and
a fixing member fixed to a first portion of the base frame, wherein
the backrest is fixed to the base frame with the side surface of the backrest disposed adjacent to the first portion of the base frame,
the movable portion is attached to the fixing member to be rotatable relative to the fixing member,
the seat comprises a seat frame comprising:
a first side plate fixed to a second portion of the base frame adjacent to the first portion of the base frame;
a first side arm attached to the first side plate to be rotatable relative to the first side plate;
a second side plate fixed to a third portion of the base frame opposite from the second portion of the base frame,
a second side arm attached to the second side plate to be rotatable relative to the second side plate;
a pipe frame having a rectangular frame shape to define an outline of the seat and fixed to the first side arm and the second side arm; and
a panel fixed to the pipe frame and including a surface disposed along the seat surface, and
the holding member is attached to the first side plate.

11. The vehicle seat assembly according to claim 10, further comprising:
a locking mechanism to lock the seat in the seat folded position; and
a lever connected to the locking mechanism and configured to release the seat from the locking mechanism, wherein
the locking mechanism is disposed between the second side plate and the second side arm.

12. The vehicle seat assembly according to claim 5, further comprising an interlocking mechanism configured to rotate the movable portion in conjunction with rotation of the seat between the folded position and the unfolded position, wherein
when the seat is locked in the seat folded position, the movable portion is locked in the folded position through the interlocking mechanism.

13. The vehicle seat assembly according to claim 5, wherein
the seat surface of the seat in the seat folded position is opposed to the front surface of the backrest.

14. The vehicle seat assembly according to claim 5, wherein
the projecting portion is configured to project in the front-rear direction of the backrest from an upper portion of the base portion so as to project beyond the movable portion when the movable portion is in the folded position.

15. The vehicle seat assembly according to claim 5, wherein
the movable portion includes an extending surface that extends from a first end of the armrest surface such that when the movable portion is in the unfolded position the extending surface is inclined downward and rearwardly toward the base portion in the front-rear direction of the backrest and when the movable portion is in the folded position the extending surface is in a vertical position and the armrest surface is inclined upward and forwardly in the front-rear direction of the backrest along a lower side of the projecting portion.

16. The vehicle seat assembly according to claim 5, wherein
when the movable portion is in the folded position and the seat is in the seat folded position the armrest projects forwardly of the seat in the front-rear direction of the backrest.

* * * * *